Aug. 28, 1923.
C. T. THORSSELL ET AL
1,466,571
PROCESS FOR AGGLOMERATING PULVEROUS MATERIALS
Filed Dec. 29, 1921
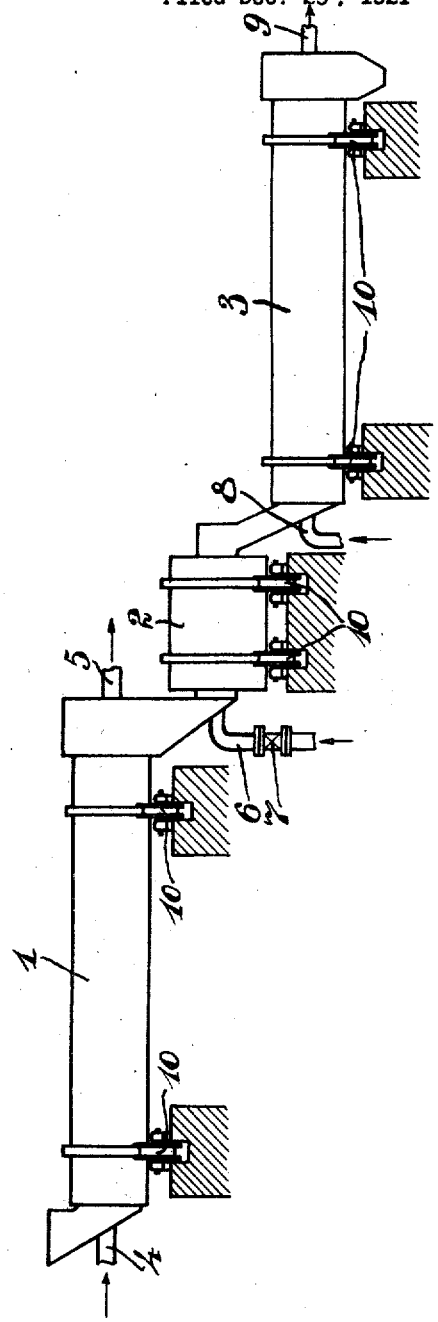
Inventors
C. T. Thorssell
O. Troell Patented Aug. 28, 1923.

1,466,571

UNITED STATES PATENT OFFICE.

CARL THEODOR THORSSELL AND OTTO TROELL, OF GOTTENBORG, SWEDEN, ASSIGNORS TO AKTIEBOLAGET KVAFVEINDUSTRI, OF GOTTENBORG, SWEDEN.

PROCESS FOR AGGLOMERATING PULVEROUS MATERIALS.

Application filed December 29, 1921. Serial No. 525,700.

*To all whom it may concern:*

Be it known that we, CARL THEODOR THORSSELL and OTTO TROELL, citizens of Sweden, residing at Gottenborg, Sweden, have invented certain new and useful Improvements in Processes for Agglomerating Pulverous Materials (for which I have made application for patents in Sweden, filed January 26, 1921, and in Great Britain, filed February 2, 1921), of which the following is a specification.

This invention relates to a process for agglomerating pulverous material, especially such material as is used for the absorption of nitrogen. When nitrogen is to be absorbed in mixtures of carbon and alkali metals, or alkaline earth metals, or their compounds, several disadvantages are associated with the use of pulverous mixtures.

In such processes for instance, pulverous mixture, has a tendency to bake together on account of the high temperature of reaction in relation to the melting point of the alkali compound used. It is obvious that this renders difficult the removal of the mass from the vessel of reaction, and also results in uneven distribution of the nitrogen thereby reducing the output of the reaction. Also if the mass in the vessel of reaction is subjected to a sudden increase of pressure in such manner that the pulverous material is ejected the powder will immediately catch fire and be the cause of fatal accidents. Granular material has therefore been used instead of powder, and experiments have shown that the use of hard grains or pieces of spherical or approximately spherical form is to be preferred, as such balls possess a greater resistance against being rubbed to pieces and do not form any dust. On the contrary, they will leave the vessel of reaction, for instance a continuously working shaft furnace, without altering their form. In spite of their hardness such grains or balls allow the penetration of quite a sufficient quantity of nitrogen, as they present large surfaces to the gas, whilst their own contact surfaces are small.

When such pulverous mixtures are agglomerated or granulated the mixture is first moistened and then worked up mechanically in a moist state to form grains or sticks. It has been proposed to manufacture such granular or stick-shaped material by pressing the mixture in apparatuses similar to brick making machines or sausage-grinders, but this method has proven to be too costly. The productiveness of such apparatuses is comparatively trifling in relation to the cost and the consumption of power is very considerable, as the material must be subjected to a very vigorous pressing through rather fine holes. The form of the agglomerated material is also unsuitable as it is very difficult to produce any forms other than sticks. The most suitable form, however, is hard balls, as indicated above.

The present invention relates to a process for agglomerating materials, whereby a considerable output is obtained with a small consumption of power. Further, the finished agglomerated material is dried at the same time as the material to be agglomerated is exposed to a preliminary drying.

When nitrogen is to be absorbed the mixture of carbon and compounds of alkali metals, or alkaline earth metals, with or without catalyzers is heated in furnaces, whereby cyanide is formed. After that the material is transferred into autoclaves in which it is treated with steam under pressure for the purpose of forming ammonia and regenerating carbonate (or the forming of formiate).

A suitable quantity of carbon is added to the carbonate or formiate removed from the autoclaves, whereafter the mixture is agglomerated and again carried back to the furnace of reaction. The percentage of water in the mixture to be agglomerated cannot be kept perfectly fixed and is usually greater than is suitable for the agglomerating operation. Even if this is not the case it is best to keep the percentage of water somewhat greater than is necessary and afterwards to adjust the same in a drying apparatus to the percentage most suitable for the material in question. The fact is that a different degree of wetness is required at the agglomerating operation for different materials.

According to the invention therefore the material containing more water than is suitable for the agglomerating process is first dried in such a way that it attains a proper degree of wetness. This is preferably done in one or more rotating cylinders or the like which are heated internally by means of burning gases passing through the same, preferably in the same direction as the material in order to lessen the burning up of the coal in the material as much as possible. In this drying apparatus balls commence to be formed which however are rather irregular in shape and soft.

From this drying apparatus the mixture is carried to another arrangement of rotating cylinders for the agglomerating proper. The degree of wetness must here be kept constant and this is done by passing gases containing steam through these cylinders. In addition steam may be admitted directly to this apparatus for regulating the degree of wetness by connecting the cylinders with a steam pipe through adjustable valves or the like. In this apparatus the balls prepared in the drying apparatus mentioned above develops into hard, almost perfectly spherical grains.

After this the grains or balls thus finished are carried to a final drying apparatus which also preferably consists of one or more rotating cylinders internally heated by burning gases which are preferably passed through the cylinders in the same direction as the material. The drying operation easily takes place on account of the spherical form of the material, whereby a large surface is presented to the hot gases. These gases having passed through the drying apparatus and there taken up a quantity of steam are then wholly or in part carried to the intermediate apparatus where the agglomerating proper takes place and help there to keep the percentage of water constant. The dust eventually carried away by these gases from the drying apparatus sticks fast to the balls in the agglomerating system and is worked into them.

A simple form of apparatus for carrying out the process herein disclosed is illustrated in the accompanying drawings, in which, the figure represents diagrammatically the apparatus employed.

In the illustration 1 represents the first rotating cylinder, in which the material is dried to a certain degree; 2 represents the second cylinder in which the degree of wetness is kept approximately constant and 3 is the third cylinder in which the material is finally dried. A pipe 4 is provided to supply burning gases to cylinder 1, which burning gases escape through outlet 5 from said cylinder 1. Steam is supplied to cylinder 2 by means of a pipe 6, a valve for controlling the steam being indicated at 7. Burning gases are supplied to the drying cylinder 3 by a pipe 8 and permitted to escape from said cylinder through pipe 9. Cylinders 1, 2, and 3 are supported for rotation, such being here indicated by rollers 10 on which the cylinders are supported, with the rollers arranged to be operated in any usual or preferred manner.

What we claim is:

1. Process for agglomerating pulverous materials consisting in passing the material through two systems of heated, rotating cylinders, in the first of which systems the material is dried to a certain degree of wetness whilst the degree of wetness is kept approximately constant in the second system, where the agglomerating proper takes place, whereafter the material agglomerated in the second system is carried to a third system consisting of one or more heated, rotating cylinders and there dried.

2. Process for agglomerating pulverous materials consisting in passing the material through two systems of rotating cylinders internally heated by burning gases, in the first of which systems the material is dried to a certain degree of wetness whilst the degree of wetness is kept approximately constant in the second system, where the agglomerating proper takes place, whereafter the material agglomerated in the second system is carried to a third system consisting of one or more rotating cylinders internally heated by burning gases and there dried.

3. Process for agglomerating pulverous materials consisting in passing the material through two systems of heated, rotating cylinders, in the first of which systems the material is dried to a certain degree of wetness whilst the degree of wetness is kept approximately constant in the second system, where the agglomerating proper takes place, whereafter the material agglomerated in the second system is carried to a third system consisting of one or more heated, rotating cylinders and there dried, steam being introduced in adjustable quantities into the second system for the purpose of regulating the degree of wetness.

4. Process for agglomerating pulverous materials consisting in passing the material through two systems of rotating cylinders internally heated by burning gases, in the first of which systems the material is dried to a certain degree of wetness whilst the degree of wetness is kept approximately constant in the second system, where the agglomerating proper takes place, whereafter the material agglomerated in the second system is carried to a third system consisting of one or more rotating cylinders internally heated by burning gases and there dried, the gases leaving the third system being passed wholly or partly to the second system in order to keep the degree of wetness constant.

5. Process for agglomerating pulverous materials consisting in passing the material through two systems of rotating cylinders internally heated by burning gases, in the first of which systems the material is dried to a certain degree of wetness whilst the degree of wetness is kept approximately constant in the second system, where the agglomerating proper takes place, whereafter the material agglomerated in the second system is carried to a third system consisting of one or more rotating cylinders internally heated by burning gases and there dried, the heating gases being passed through the first system in the same direction as the material to be treated.

6. Process for agglomerating pulverous materials consisting in passing the material through two systems of rotating cylinders, internally heated by burning gases, in the first of which systems the material is dried to a certain degree of wetness whilst the degree of wetness is kept approximately constant in the second system, where the agglomerating proper takes place, whereafter the material agglomerated in the second system is carried to a third system consisting of one or more rotating cylinders internally heated by burning gases and there dried, the heating gases being passed through the third system in the same direction as the agglomerated material.

In testimony whereof, we have signed our names to this specification in the presence of two subscribing witnesses.

CARL THEODOR THORSSELL.
OTTO TROELL.

Witnesses as to signature of Carl Theodor Thorssell:
    E. JOHNSON,
    A. T. LUNCY.

Witnesses as to signature of Otto Troell:
    G. PETERSSON,
    PHILIP WILKONS.